United States Patent
Perumalla et al.

(10) Patent No.: US 12,091,058 B2
(45) Date of Patent: Sep. 17, 2024

(54) VIRTUAL STEERING WHEEL WITH AUTONOMOUS VEHICLE

(71) Applicant: INTERNATIONAL BUSINESS MACHINES CORPORATION, Armonk, NY (US)

(72) Inventors: Saraswathi Sailaja Perumalla, Visakhapatnam (IN); Sarbajit K. Rakshit, Kolkata (IN); Rachana Vishwanathula, Hyderabad (IN); Vani Thangaraju, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 17/807,739

(22) Filed: Jun. 20, 2022

(65) Prior Publication Data
US 2023/0406363 A1    Dec. 21, 2023

(51) Int. Cl.
*B60W 50/16* (2020.01)
*B60W 60/00* (2020.01)
(Continued)

(52) U.S. Cl.
CPC ........ *B60W 60/0053* (2020.02); *B60W 50/16* (2013.01); *G03H 1/0005* (2013.01);
(Continued)

(58) Field of Classification Search
CPC ............. B60W 60/0053; B60W 50/16; B60W 2050/146; B60W 2540/215; G03H 1/0005;
(Continued)

(56) References Cited

U.S. PATENT DOCUMENTS 9,586,618 B2    3/2017  Sham
2013/0204457 A1*  8/2013  King ................... B60R 16/0373
                                                            701/1
(Continued)

FOREIGN PATENT DOCUMENTS

CN           110349472 B     8/2021
KR          20210097234 A     8/2021
(Continued)

OTHER PUBLICATIONS

Author Unknown, "Feeling virtual objects in mid-air using ultrasound," Kurzweil, Dec. 3, 2014, https://www.kurzweilai.net/feeling-virtual-objects-in-mid-air-using-ultrasound, 3 pages.
(Continued)

*Primary Examiner* — Justin Holmes
(74) *Attorney, Agent, or Firm* — Anthony M. Pallone

(57) ABSTRACT

According to one embodiment, a method, computer system, and computer program product for manual driving of an autonomous vehicle via a virtual steering wheel. The embodiment may include identifying a user request to manually drive an autonomous vehicle. In response to determining that driving credentials of the user are validated, the embodiment may include displaying a virtual steering wheel to the user within the autonomous vehicle. The embodiment may include providing haptic feedback to the user in response to hand-based interaction with the displayed virtual steering wheel. The embodiment may include enabling manual drive of the autonomous vehicle by the user via the displayed virtual steering wheel.

17 Claims, 5 Drawing Sheets

(51) Int. Cl.
*G03H 1/00* (2006.01)
*B60K 35/00* (2006.01)
*B60K 35/25* (2024.01)
*B60W 50/14* (2020.01)

(52) U.S. Cl.
CPC .............. *B60K 35/00* (2013.01); *B60K 35/25* (2024.01); *B60K 2360/29* (2024.01); *B60W 2050/146* (2013.01); *B60W 2540/215* (2020.02); *G03H 2001/0061* (2013.01)

(58) Field of Classification Search
CPC ......... G03H 2001/0061; G03H 1/2294; G03H 3/00; B60K 35/00; B60K 35/25; B60K 2360/29; G06F 3/016
See application file for complete search history.

(56) References Cited

U.S. PATENT DOCUMENTS

| 2020/0073379 A1* | 3/2020 | Elkins | B60W 60/0053 |
| 2022/0009512 A1* | 1/2022 | Urano | B60W 40/09 |
| 2022/0055482 A1* | 2/2022 | Brissman | B62D 1/06 |

FOREIGN PATENT DOCUMENTS

| KR | 102303412 B1 | 9/2021 |
| WO | WO-2018097818 A1 * | 5/2018 |

OTHER PUBLICATIONS

Mell et al., "The NIST Definition of Cloud Computing", National Institute of Standards and Technology, Special Publication 800-145, Sep. 2011, 7 pages.

* cited by examiner

VIRTUAL STEERING WHEEL WITH AUTONOMOUS VEHICLE

BACKGROUND

The present invention relates generally to the field of computing, and more particularly to autonomous vehicles.

An autonomous vehicle, also known as a self-driving car, is a car which incorporates vehicular automation and is capable of sensing its environment and moving safely with little or no human input. A self-driving car may utilize a variety of on-board sensor systems and actuators, as well as advanced artificial intelligence (AI) and machine learning (ML) algorithms to perceive its environment. Examples of on-board sensor systems may include thermographic cameras, radar detection, lidar ranging, sonar, global positioning system (GPS) capability, odometry analysis, and inertial measurement units (e.g., accelerometers, gyroscopes, magnetometers). The advanced AI and ML algorithms may interpret sensory information to create a constantly updated mapping of the environment, detect the presence of nearby vehicles and pedestrians, measure distances and detect uneven surfaces in roads and sidewalks, and identify appropriate navigation paths, as well as obstacles and relevant traffic/road signs. The Society of Automotive Engineers (SAE) has defined six levels of autonomous vehicle automation which have been adopted by the United States Department of Transportation ranging from Level 0 (no automation) to Level 5 (steering wheel optional).

SUMMARY

According to one embodiment, a method, computer system, and computer program product for manual driving of an autonomous vehicle via a virtual steering wheel. The embodiment may include identifying a user request to manually drive an autonomous vehicle. In response to determining that driving credentials of the user are validated, the embodiment may include displaying a virtual steering wheel to the user within the autonomous vehicle. The embodiment may include providing haptic feedback to the user in response to hand-based interaction with the displayed virtual steering wheel. The embodiment may include enabling manual drive of the autonomous vehicle by the user via the displayed virtual steering wheel.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
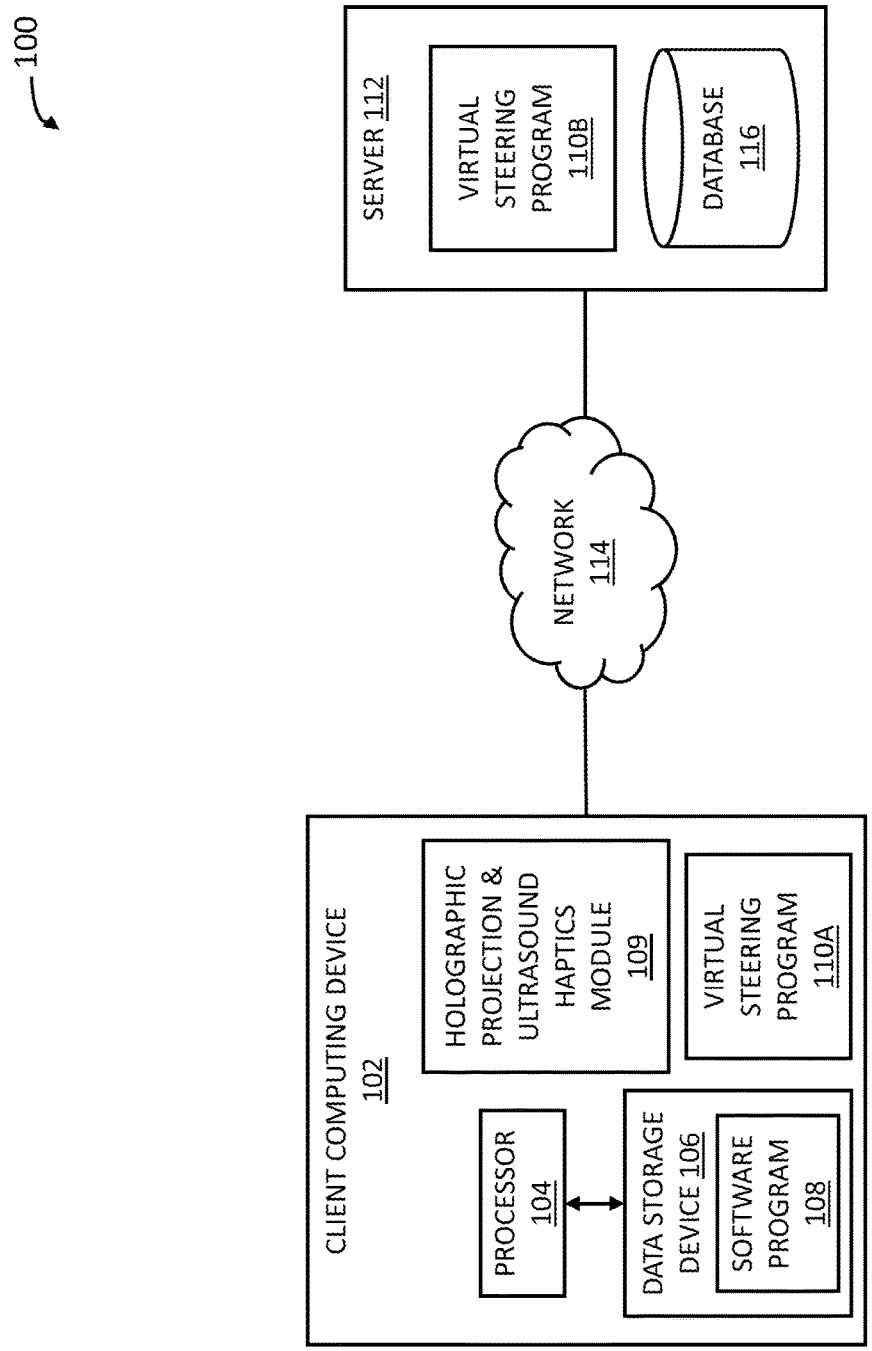
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate generally to the field of computing, and more particularly to autonomous vehicles. The following described exemplary embodiments provide a system, method, and program product to, among other things, display a virtual steering wheel within an autonomous vehicle without a physical steering wheel. Therefore, the present embodiment has the capacity to improve the technical field of autonomous vehicles by dynamically enabling manual driving of an autonomous vehicle via a displayed virtual steering wheel.

As previously described, an autonomous vehicle, also known as a self-driving car, is a car which incorporates vehicular automation and is capable of sensing its environment and moving safely with little or no human input. A self-driving car may utilize a variety of on-board sensor systems and actuators, as well as advanced AI and ML algorithms to perceive its environment. Examples of on-board sensor systems may include thermographic cameras, radar detection, lidar ranging, sonar, GPS capability, odometry analysis, and inertial measurement units (e.g., accelerometers, gyroscopes, magnetometers). The advanced AI and ML algorithms may interpret sensory information to create a constantly updated mapping of the environment, detect the presence of nearby vehicles and pedestrians, measure distances and detect uneven surfaces in roads and sidewalks, and identify appropriate navigation paths, as well as obstacles and relevant traffic/road signs. The SAE has defined six levels of autonomous vehicle automation which have been adopted by the United States Department of Transportation ranging from Level 0 (no automation) to Level 5 (steering wheel optional).

As noted above, the SAE has defined a Level 5 vehicle automation level in which no human/driver intervention is required. In such an autonomous vehicle, the steering wheel (and other manual mode driving mechanisms such as accelerator and brake pedals) may be optional. An autonomous vehicle without a physical steering wheel may be beneficial as the steering wheel typically occupies a moderate amount of space inside the vehicle and is typically limited to one side of the vehicle. However, the act of driving itself may be a desirable experience for an individual despite their use of an autonomous vehicle without a physical steering wheel, and at times the user may wish to engage in manual driving of the autonomous vehicle. Accordingly, the user will require a steering mechanism with which to manually drive the autonomous vehicle. It may therefore be imperative to have a system in place to display a virtual steering wheel with which the user may engage in a manual drive mode of the autonomous vehicle. Thus, embodiments of the present invention may be advantageous to, among other things, receive an indication of, or detect, a user's preference/request to manually drive an autonomous vehicle without a physical steering wheel, and accordingly, display to the user a virtual steering wheel with which the user may engage in manual driving of the autonomous vehicle. The present invention does not require that all advantages need to be incorporated into every embodiment of the invention.

According to at least one embodiment, a user's request to manually drive an autonomous vehicle may be received or detected. Upon validation of driving credentials of the user, a virtual steering wheel may be generated and displayed to the user. The displayed virtual steering wheel may enable manual steering of the autonomous vehicle by the user. According to at least one embodiment, accelerating and braking operations of the autonomous vehicle may also be manually controlled by the user via the displayed virtual steering wheel. According to at least one embodiment, the virtual steering wheel may be displayed to the user via a head-mounted extended reality (XR) module (e.g., augmented reality (AR) smart glasses) which is paired with the autonomous vehicle. According to at least one other embodiment, the virtual steering wheel may be displayed to the user via a heads-up display (HUD) module of the autonomous vehicle. An ultrasound-based haptic effect module of the autonomous vehicle may be utilized to create and align mid-air ultrasound haptic effects with a profile of the displayed virtual steering wheel so that the user may feel a physical presence of the virtual steering wheel while performing hand-based interaction with the virtual steering wheel. According to at least one other embodiment, haptic feedback enabled wired gloves may be worn by the user and provide the physical presence of the virtual steering wheel. According to at least one further embodiment, a primary virtual steering wheel and a secondary virtual steering wheel may be displayed concurrently.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to detect a user's request to manually drive an autonomous vehicle and, accordingly, enable the user to manually drive the autonomous vehicle via a displayed virtual steering wheel.

Referring to FIG. 1, an exemplary networked computer environment 100 is depicted, according to at least one embodiment. The networked computer environment 100 may include a client computing device 102 and a server 112 interconnected via a communication network 114. According to at least one implementation, the networked computer environment 100 may include a plurality of client computing devices 102 and servers 112, of which only one of each is shown for illustrative brevity. Additionally, in one or more embodiments, the client computing device 102 may independently host a virtual steering (VS) program 110A, 110B. In one or more other embodiments, the VS program 110A, 110B may be partially hosted on client computing device 102 and server 112 so that functionality may be separated among the devices. However, in embodiments where the VS program 110A, 110B is partially hosted on client computing device 102 and server 112, functionality of the VS program 110A, 110B hosted on server 112 may be limited to a review of outputted data metrics of the VS program 110A, 110B hosted on client computing device 102.

The communication network 114 may include various types of communication networks, such as a personal area network (PAN), wide area network (WAN), local area network (LAN), a telecommunication network, a wireless network, a wireless ad hoc network (i.e., a wireless mesh network), a public switched network, and/or a satellite network. The communication network 114 may include connections, such as wired or wireless communication links or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104, a data storage device 106, and a holographic projection & ultrasound haptics module 109 that is enabled to host and run a software program 108 and a VS program 110A and communicate with the server 112 via the communication network 114, in accordance with embodiments of the invention. Client computing device 102 may be any type of fully automated self-driving car (e.g., an SAE Level 5 autonomous vehicle) having a variety of sensors (not shown) (e.g., thermographic cameras, radar, lidar, sonar, GPS, odometry analysis, and inertial measurement units) and AI and ML algorithms (e.g., software program 108), and capable of running a program and accessing a network. The holographic projection & ultrasound haptics (HP-UH) module 109 may include an XR headset such as AR smart glasses, a vehicle mounted automotive heads-up display, and an ultrasound haptic device consisting of a phased array of ultrasound transducers and capable of creating mid-air haptic effects. The HP-UH module 109 may communicate (i.e., send and receive data) with the software program 108 and the VS program 110A. As will be discussed with reference to FIG. 3, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of partially hosting and running a VS program 110B and a database 116 and communicating with the client computing device 102 via the communication network 114, in accordance with embodiments of the invention. In embodiments where the server 112 partially hosts and runs the VS program 110B, functionality of the VS program 110B may be limited to a review of any outputted data metrics of the VS program 110A hosted on the client computing device 102. As will be discussed with reference to FIG. 3, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the VS program 110A, 110B may be a program capable of analyzing received sensor information of an autonomous vehicle and identifying a current driving context, collecting and maintaining historical learning of a user's driving behavior, identifying a user's preference/request to manually drive the autonomous vehicle, capturing voice commands of the user, validating driving credentials/authorization of the user, displaying a virtual steering wheel to the user, monitoring hand-based interaction of the user with the displayed virtual steering wheel, providing haptic and/or visual feedback to the user in response to the user's hand-based interaction with the displayed virtual steering wheel, and enabling a manual drive mode of the autonomous vehicle via the displayed virtual steering wheel. In at least one embodiment, the VS program 110A, 110B may require a user to opt-in to system usage upon opening or installation of the VS program 110A, 110B or upon entering an autonomous vehicle equipped with the VS program 110A, 110B. The virtual steering method is explained in further detail below with respect to FIG. 2.

Figure 2:
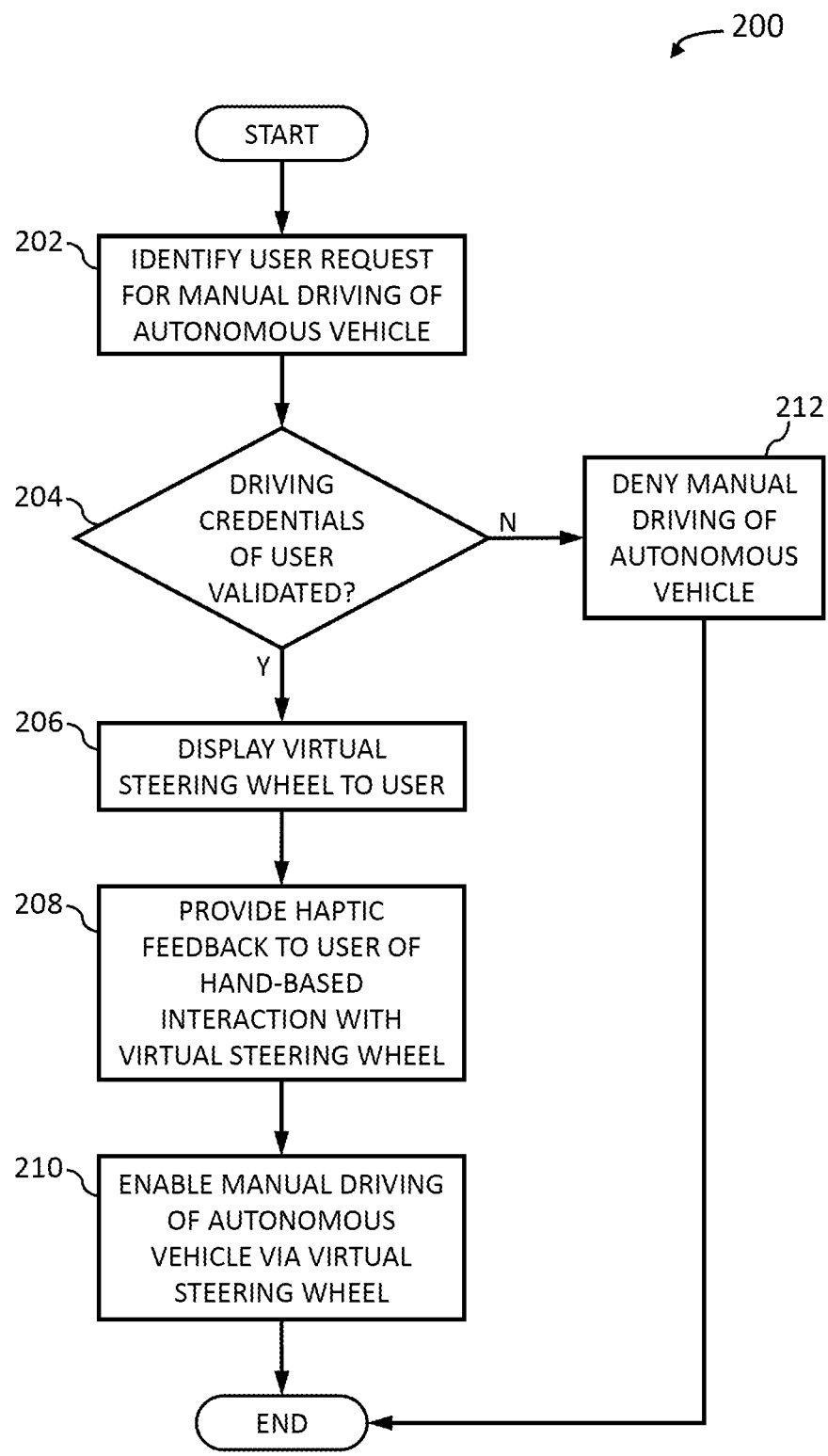
FIG. 2 illustrates an operational flowchart for enabling manual driving of an autonomous vehicle via a displayed virtual steering wheel in a virtual steering process according to at least one embodiment.

Referring now to FIG. 2, an operational flowchart for enabling manual driving of an autonomous vehicle via a displayed virtual steering wheel in a virtual steering process 200 is depicted according to at least one embodiment. At 202, the VS program 110A, 110B identifies a user's request to engage in manual driving an autonomous vehicle in which they are a front occupant (i.e., sitting in a driver seat or in a front passenger seat). According to embodiments of the invention, the autonomous vehicle may be an SAE Level 5 self-driving car without a physical steering wheel (e.g., client computing device 102). According to at least one embodiment, identification of the user's request to engage in a manual drive mode of the autonomous vehicle may be based on user input received by the VS program 110A, 110B (e.g., a voice command of the user, captured by a microphone of the client computing device 102, to engage in manual driving or a button-press by the user to engage in manual driving).

According to at least one other embodiment, identification of the user's request to engage in a manual drive mode of the autonomous vehicle may be based on biometrics of the user received by the VS program 110A, 110B. For example, the VS program 110A, 110B may identify an excitement level of the user based on a heartrate of the user, perspiration of the user, and facial expressions of the user. Biometric sensors may be worn by the user and transmit information to the VS program 110A, 110B. Additionally, the VS program 110A, 110B may utilize interior cameras of the autonomous vehicle to identify user facial expressions. In response to an identified excitement level of the user, the VS program 110A, 110B may prompt the user, via an interior display of the autonomous vehicle or via a voice prompt, for engagement in manual drive mode of the autonomous vehicle.

According to at least one further embodiment, identification of the user's request to engage in a manual drive mode of the autonomous vehicle may be based on historical learning of a user's driving preferences and behaviors. During a system initialization phase, the VS program 110A, 110B may create a knowledge base of driver profiles for users of the system. A driver profile of a user may include information such as age, driver license type(s), driving record, vehicle type driving authorization(s), specified vehicle driving authorization(s), manual driving preferences (e.g., identified routes/roads for manual drive mode, specified weather/road/traffic conditions for manual drive mode, specified vehicle(s) or vehicle type(s) for manual drive mode), and autonomous driving preferences (e.g., identified routes/roads for autonomous drive mode, specified weather/road/traffic conditions for autonomous drive mode). The knowledge base of driver profiles may be stored within data storage device 106 or within database 116 and accessed via network 114. During a system implementation phase, the VS program 110A, 110B may access the driver profile of the user and compare the user's manual driving preferences with a current driving context identified by the VS program 110A, 110B. The VS program 110A, 110B may utilize a variety of sensors (e.g., thermographic cameras, radar, lidar, sonar, GPS, odometry analysis, and inertial measurement units) of the autonomous vehicle (e.g., client computing device 102) to identify the current driving context (e.g., current weather, road, and traffic conditions, nearby vehicles or obstacles). In response to the user's manual driving preferences and the current driving context having a threshold level of match, the VS program 110A, 110B may prompt the user, via an interior display of the autonomous vehicle or via a voice prompt, for engagement in manual drive mode of the autonomous vehicle.

Next, at 204, the VS program 110A, 110B determines whether the user is authorized for manual driving of the autonomous vehicle through a validation of the user's driving credentials. In making this determination, the VS program 110A, 110B may access the user's driver profile within the knowledge base of driver profiles and reference information of the user including age, driver license type(s), driving record, vehicle type driving authorization(s), and specified vehicle driving authorization(s) to determine if the user is authorized for manual driving of the autonomous vehicle. For example, the VS program 110A, 110B may verify that the user is of or above a required minimum driving age, has a valid driver license type appropriate for the autonomous vehicle (e.g., client computing device 102), and is authorized to manually drive the autonomous vehicle. As another example, the VS program 110A, 110B may maintain a list of users specified by an owner of the autonomous vehicle as being authorized to manually drive the autonomous vehicle and may verify that the user requesting to manually drive the autonomous vehicle is among the list of authorized users. In response to determining that the user is authorized for manual driving of the autonomous vehicle (step 204, "Y" branch), the virtual steering process 200 may proceed to step 206. In response to determining that the user is not authorized for manual driving of the autonomous vehicle (step 204, "N" branch), the virtual steering 200 may proceed to step 212.

According to at least one embodiment, where the user requesting manual drive of the autonomous vehicle does not have a driver profile within the knowledge base of driver profiles, the VS program 110A, 110B may prompt the user, via an interior display of the autonomous vehicle or via a voice prompt, to provide their driving credentials. The VS program 110A, 110B may also request authorization from an owner of the autonomous vehicle to allow the user to engage in manual driving of the autonomous vehicle. Additionally, the VS program 110A, 110B may create a driver profile for the user within the knowledge base of driver profiles.

At 206, in response to determining that the user is authorized for manual driving of the autonomous vehicle, the VS program 110A, 110B generates and displays a virtual steering wheel to the user. According to at least one embodiment, the VS program 110A, 110B may utilize a holographic projection system (e.g., HP-UH module 109) of the autonomous vehicle (e.g., client computing device 102) to generate and display the virtual steering wheel. The holographic projection system of the autonomous vehicle may include a vehicle mounted automotive heads-up display positioned in front of the driver seat and the front passenger seat. The generated virtual steering wheel may be projected in mid-air and in front of the user requesting to manually drive the autonomous vehicle. The VS program 110A, 110B may identify a position/location of the displayed virtual steering wheel within the autonomous vehicle with respect to a front dashboard area of the autonomous vehicle and with respect to eye and shoulder levels of the user identified by the VS program 110A, 110B utilizing interior cameras of the autonomous vehicle. Positioning of the displayed virtual steering wheel may be maintained with respect to the interior space of the autonomous vehicle (i.e., the front dashboard area) so that head movement of the user will not change the positioning of the displayed virtual steering wheel. The VS program 110A, 110B may update the driver profile of the user to include information of the identified position/location of the displayed virtual steering wheel within the autonomous vehicle. Furthermore, the user may reposition the displayed virtual steering wheel according to their preference and, after the repositioning, the VS program 110A, 110B may identify the position/location of the displayed virtual steering wheel and update the driver profile of the user accordingly.

It should be noted that the VS program 110A, 110B may limit the user's ability to reposition the displayed virtual steering wheel to specified ranges of up/down adjustments and telescoping adjustments. It should also be noted that the VS program 110A, 110B may display the generated virtual steering wheel on any side (i.e., driver-side or passenger-side) of the autonomous vehicle based on the user's seating position within the autonomous vehicle (i.e., the driver seat or the front passenger seat). In doing so, the VS program 110A, 110B may obviate a need for the user to change their front seating position before engaging in a manual drive mode of the autonomous vehicle.

According to at least one other embodiment, the VS program 110A, 110B may utilize a head-mounted extended reality system (e.g., HP-UH module 109) of the autonomous vehicle (e.g., client computing device 102) to generate and display the virtual steering wheel to the user. The head-mounted XR system may include AR smart glasses which are worn by the user and paired (e.g., via a Bluetooth® connection) with the VS program 110A, 110B and the autonomous vehicle (Bluetooth and all Bluetooth-based trademarks and logos are trademarks or registered trademarks of Bluetooth SIG, Inc. and/or its affiliates). The generated virtual steering wheel may be displayed within a field of view created by the AR smart glasses. Identification of the position/location of the displayed virtual steering wheel within the autonomous vehicle may be performed by the VS program 110A, 110B as described above.

Next, at 208, the VS program 110A, 110B provides haptic feedback to the user in response to their hand-based interaction with the displayed virtual steering wheel. According to at least one embodiment, the VS program 110A, 110B may utilize an ultrasound haptic device consisting of a phased array of ultrasound transducers and an acoustically transparent display (e.g., HP-UH module 109) of the autonomous vehicle (e.g., client computing device 102) to create tactile focal points in mid-air through which the user may feel haptic feedback in response to their hand-based interaction with the displayed virtual steering wheel. The VS program 110A, 110B may align the created mid-air tactile focal points with a profile of the displayed virtual steering wheel so that the user may feel a physical presence of the displayed virtual steering wheel while performing hand-based actions (e.g., griping, rotating) with the virtual steering wheel. Moreover, the VS program 110A, 110B, via the HP-UH module 109, may align the mid-air tactile focal points around the entire profile of the displayed virtual steering wheel so that haptic feedback may be felt by the user around the displayed virtual steering wheel. Additionally, the VS program 110A, 110B may utilize interior cameras of the autonomous vehicle to track the user's hand-based actions with the displayed virtual steering wheel and, accordingly, control the haptic feedback provided to the user in response to their actions. For example, the user may feel rotation of the displayed virtual steering wheel through the haptic feedback provided in response to their performed act of rotation.

According to at least one embodiment, the VS program 110A, 110B may provide the user with visual and/or haptic feedback to alert the user of proper hand placement on the displayed virtual steering wheel. Visual alerts may be provided via an interior display of the autonomous vehicle or via the HP-UH module 109. The HP-UH module 109 may also be utilized to provide the haptic feedback. For example, if the VS program 110A, 110B detects, via interior cameras of the autonomous vehicle or through created mid-air tactile focal points, that the user's hand placement (i.e., grip) on the displayed virtual steering wheel is out of alignment with the profile of the displayed virtual steering wheel, the VS program 110A, 110B may prompt the user, visually (e.g., a text prompt, a flashing color around the displayed virtual steering wheel) and/or with a pre-defined haptic feedback pattern, to reposition their hands to be in alignment with the profile of the displayed virtual steering wheel (i.e., the user's grip on the displayed virtual steering wheel aligns with the created mid-air tactile focal points). According to at least one other embodiment, the VS program 110A, 110B may also prompt the user via a voice command, heard through a speaker of the autonomous vehicle, to reposition their hands to be in alignment with the profile of the displayed virtual steering wheel in response to detection of the user's hand placement on the displayed virtual steering wheel being out of alignment with the profile of the displayed virtual steering wheel. According to yet another embodiment, the VS program 110A, 110B may provide the user with visual and/or haptic feedback to alert the user of their turning actions performed with the displayed virtual steering wheel. For example, the VS program 110A, 110B may display a number of degrees of rotation of the displayed virtual steering wheel performed by the user.

According to at least one further embodiment, the VS program 110A, 110B may utilize haptic feedback enabled wired gloves, in lieu of an ultrasound haptic device, to provide the user with the physical presence of the displayed virtual steering wheel and haptic feedback in response to their hand-based interaction with the displayed virtual steering wheel. For example, where the VS program 110A, 110B utilizes a head-mounted XR system (e.g., AR smart glasses) to generate and display the virtual steering wheel to the user, haptic feedback enabled wired gloves, which are worn by the user and paired with the head-mounted XR system, may be utilized by the VS program 110A, 110B to provide the user with haptic feedback in response to their hand-based interaction with the displayed virtual steering wheel. Furthermore, the VS program 110A, 110B may utilize the haptic feedback enabled wired gloves to track the user's hand-based actions with the displayed virtual steering wheel and, accordingly, control the haptic feedback provided to the user in response to their actions.

At 210, the VS program 110A, 110B enables manual driving by the user of the autonomous vehicle via the displayed virtual steering wheel. The VS program 110A, 110B may communicate with AI and ML algorithms (e.g., software program 108), as well as mechanical systems, of the autonomous vehicle to transmit information of the displayed virtual steering wheel relating to how the autonomous vehicle is to be controlled (i.e., information of actions taken by the user with the displayed virtual steering wheel). The VS program 110A, 110B may track the user's hand-based actions with the displayed virtual steering wheel (e.g., angular rotation, speed of rotation) and, accordingly, identify how the autonomous vehicle is to be steered. Also, according to at least one embodiment, accelerating and braking operations of the autonomous vehicle may likewise be manually controlled by the user via the displayed virtual steering wheel. According to at least one other embodiment, the user may perform accelerating and braking operations via available physical accelerator and brake pedals while steering the autonomous vehicle via the displayed virtual steering wheel. While enabling manual drive by the user of the autonomous vehicle via the displayed virtual steering wheel, the VS program 110A, 110B may continuously identify the current driving context and update manual driving preferences within the user's driver profile.

According to at least one other embodiment, the VS program 110A, 110B may generate and currently display two virtual steering wheels on both sides (i.e., driver-side and passenger-side) of the autonomous vehicle for use by two front occupants. Each displayed virtual steering wheel may provide haptic feedback and enable manual driving of the autonomous vehicle as described above, however, in such an embodiment one displayed virtual steering wheel may be identified, by the VS program 110A, 110B, as a primary virtual steering wheel and the other displayed virtual steering wheel may be identified as a secondary virtual steering wheel. Furthermore, interactions with the primary virtual steering wheel may override interactions with the secondary virtual steering wheel. For example, concurrent display of primary and secondary virtual steering wheels may be beneficial in a driver training scenario.

According to at least one embodiment, the VS program 110A, 110B may return the autonomous vehicle to an automated drive mode in response to received user input (e.g., a voice command of the user, captured by a microphone of the client computing device 102, to engage in autonomous drive mode or a button-press by the user to engage in autonomous drive mode). According to at least one other embodiment, the VS program 110A, 110B may return the autonomous vehicle to an automated drive mode in response to biometrics of the user and/or information of interior cameras of the autonomous vehicle indicating that the user is unresponsive. For example, interior cameras of the autonomous vehicle may detect that the user's eyes have been closed for a period of time which exceeds a pre-defined threshold and, consequently, the VS program 110A, 110B may return the autonomous vehicle to an automated drive mode. As another example, interior cameras of the autonomous vehicle may detect that the user's hand placement on the displayed virtual steering wheel is out of alignment with the profile of the displayed virtual steering wheel for a period of time which exceeds a pre-defined threshold and, consequently, the VS program 110A, 110B may return the autonomous vehicle to an automated drive mode. According to at least one further embodiment, the VS program 110A, 110B may prompt the user to return the autonomous vehicle to an automated drive mode in response to the user's autonomous driving preferences and the current driving context having a threshold level of match. Upon returning the autonomous vehicle to an automated drive mode, the VS program 110A, 110B may cease display any virtual steering wheels.

At 212, in response to determining that the user is not authorized for manual driving of the autonomous vehicle, the VS program 110A, 110B denies manual driving of the autonomous vehicle by the user. According to at least one embodiment, the VS program 110A, 110B may communicate the denial of manual drive via an interior display of the autonomous vehicle and/or via an audio communication, heard through a speaker of the autonomous vehicle.

It may be appreciated that FIG. 2 provides only an illustration of one implementation and does not imply any limitations with regard to how different embodiments may be implemented. Many modifications to the depicted environments may be made based on design and implementation requirements.

Figure 3:
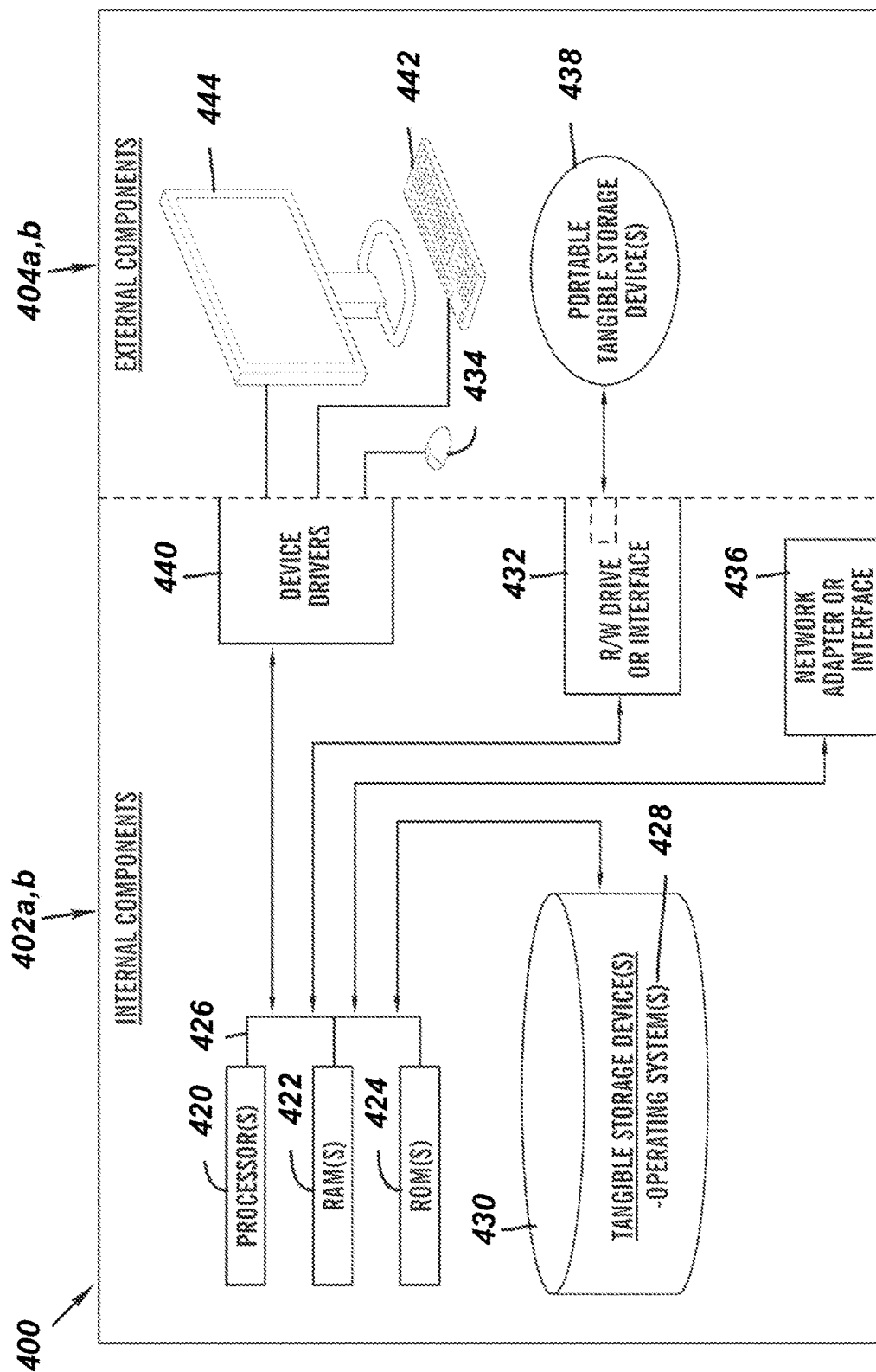
FIG. 3 is a functional block diagram of internal and external components of computers and servers depicted in FIG. 1 according to at least one embodiment.

FIG. 3 is a block diagram 400 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, IoT devices, edge devices, and distributed cloud computing environments that include any of the above systems or devices.

The client computing device 102 and the server 112 may include respective sets of internal components 402a,b and external components 404a,b illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the VS program 110A in the client computing device 102 and the VS program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 3, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the VS program 110A, 110B can be stored on one or more of the respective portable computer-readable tangible storage devices 438, read via the respective RAY drive or interface 432, and loaded into the respective hard drive 430.

Each set of internal components 402a,b also includes network adapters or interfaces 436 such as a TCP/IP adapter cards, wireless Wi-Fi interface cards, wireless Bluetooth® interface cards, or 3G, 4G, or 5G wireless interface cards or other wired or wireless communication links. The software program 108 and the VS program 110A in the client computing device 102 and the VS program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the VS program 110A in the client computing device 102 and the VS program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
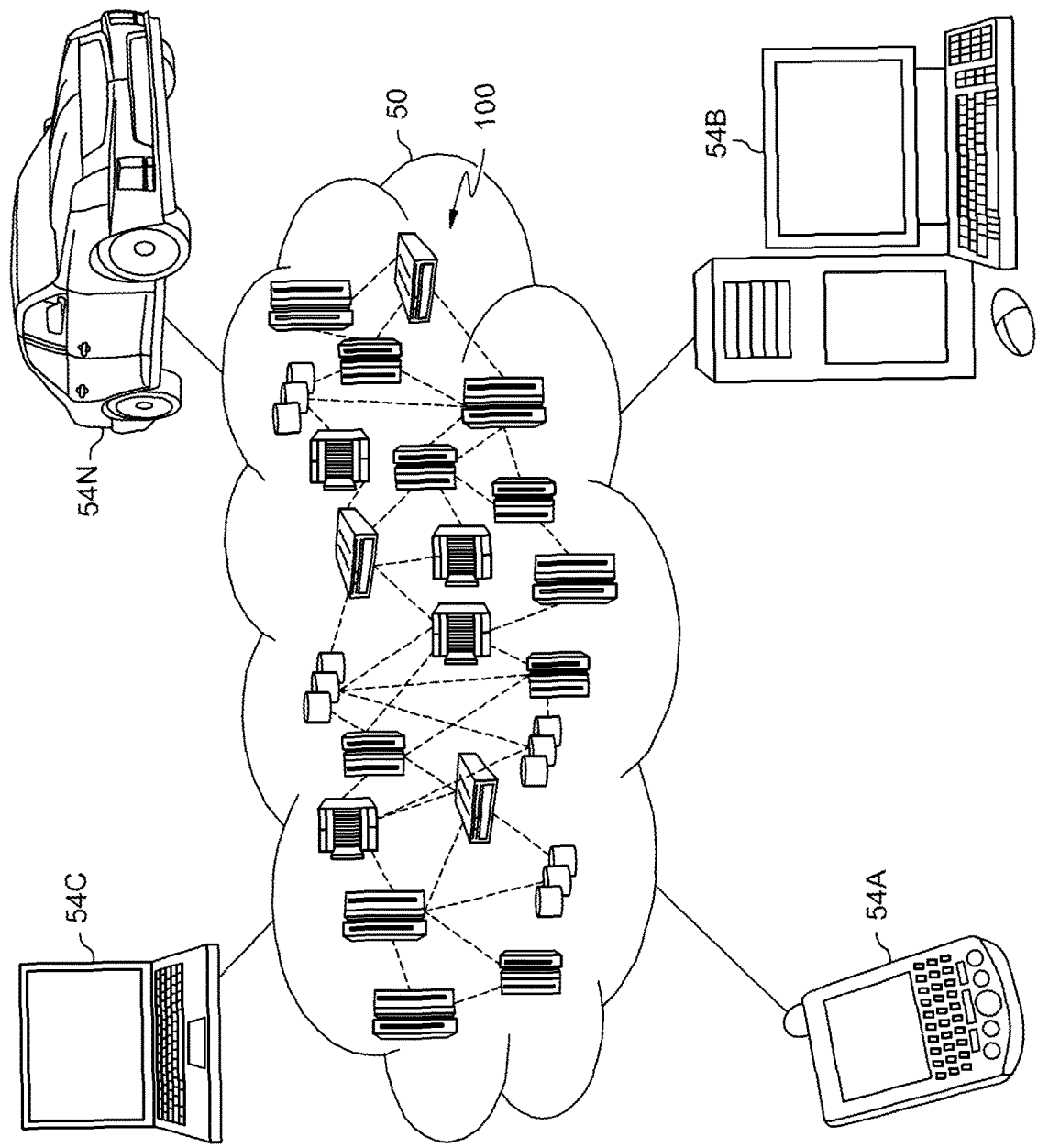
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
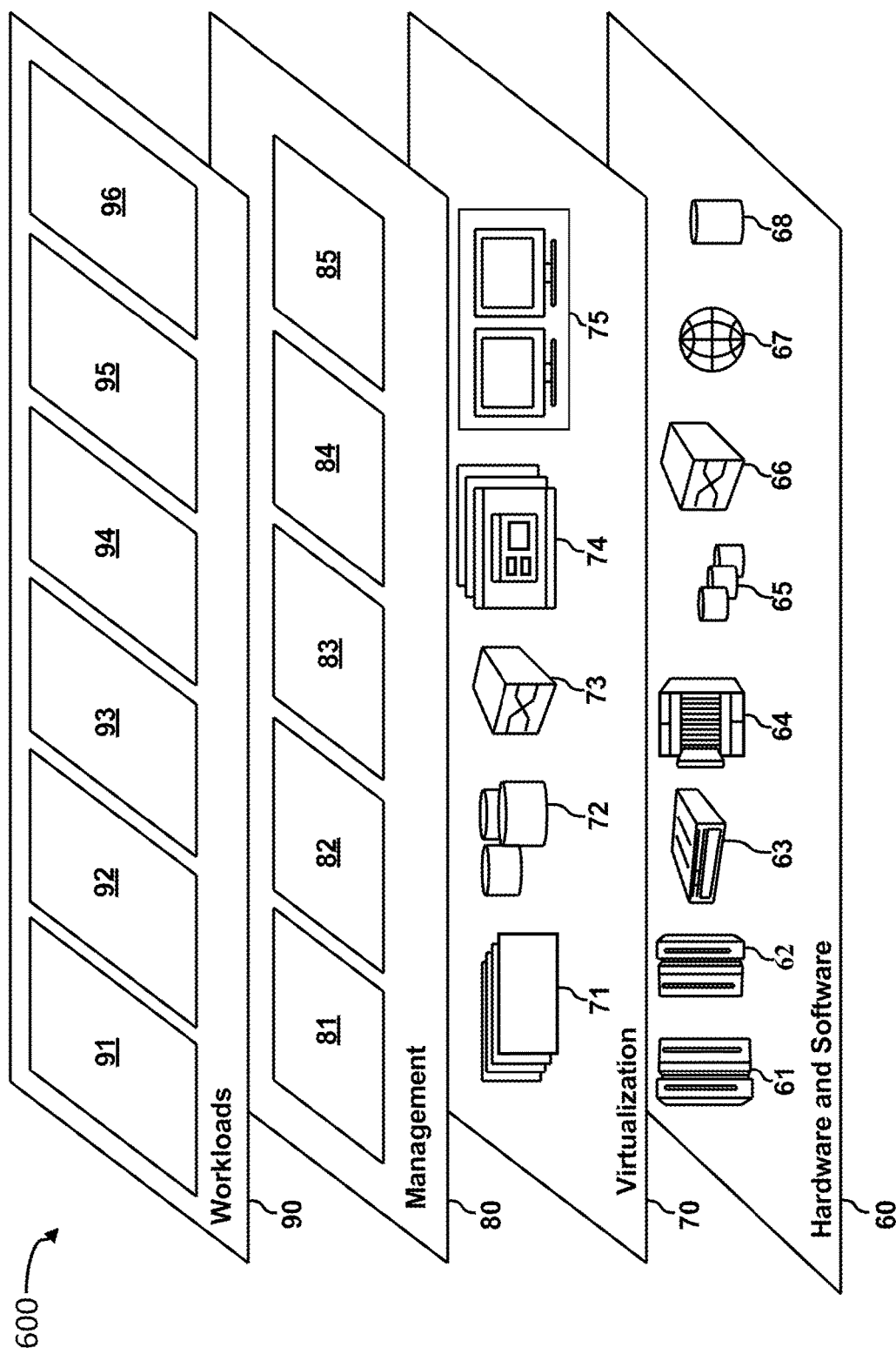
FIG. 5 depicts abstraction model layers according to an embodiment of the present invention.

Referring now to FIG. 5, a set of functional abstraction layers 600 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual steering 96. Virtual steering 96 may relate to displaying a virtual steering wheel with which a user may manually drive an autonomous vehicle.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    identifying a user request to manually drive an autonomous vehicle;
    in response to determining that driving credentials of the user are validated, displaying a virtual steering wheel to the user within the autonomous vehicle;
    providing haptic feedback to the user in response to hand-based interaction with the displayed virtual steering wheel; and
    enabling manual drive of the autonomous vehicle by the user via the displayed virtual steering wheel, wherein enabling manual drive of the autonomous vehicle by the user further comprises:
        enabling manual steering operations of the autonomous vehicle via the displayed virtual steering wheel;
        enabling manual acceleration operations of the autonomous vehicle via the displayed virtual steering wheel; and
        enabling manual braking operations of the autonomous vehicle via the displayed virtual steering wheel.

2. The method of claim 1, wherein the virtual steering wheel is displayed via a holographic projection system of the autonomous vehicle.

3. The method of claim 1, wherein the haptic feedback is created via an ultrasound haptic device of the autonomous vehicle, and wherein providing the haptic feedback further comprises:
    creating mid-air tactile focal points; and
    aligning the created tactile focal points with a profile of the displayed virtual steering wheel.

4. The method of claim 3, further comprising:
    providing visual and haptic feedback alerting the user of proper hand placement on the displayed virtual steering wheel, wherein proper hand placement comprises alignment of user hand grip with the created mid-air tactile focal points.

5. The method of claim 1, further comprising:
    in response to determining that driving credentials of the user are not validated, denying the user request to manually drive the autonomous vehicle.

6. The method of claim 1, further comprising:
    returning the autonomous vehicle to an automated drive mode in response to input from the user.

7. A computer system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
        identifying a user request to manually drive an autonomous vehicle;
        in response to determining that driving credentials of the user are validated, displaying a virtual steering wheel to the user within the autonomous vehicle;

providing haptic feedback to the user in response to hand-based interaction with the displayed virtual steering wheel; and enabling manual drive of the autonomous vehicle by the user via the displayed virtual steering wheel, wherein enabling manual drive of the autonomous vehicle by the user further comprises:

enabling manual steering operations of the autonomous vehicle via the displayed virtual steering wheel;

enabling manual acceleration operations of the autonomous vehicle via the displayed virtual steering wheel; and enabling manual braking operations of the autonomous vehicle via the displayed virtual steering wheel.

8. The computer system of claim 7, wherein the virtual steering wheel is displayed via a holographic projection system of the autonomous vehicle.

9. The computer system of claim 7, wherein the haptic feedback is created via an ultrasound haptic device of the autonomous vehicle, and wherein providing the haptic feedback further comprises:

creating mid-air tactile focal points; and aligning the created tactile focal points with a profile of the displayed virtual steering wheel.

10. The computer system of claim 9, further comprising:

providing visual and haptic feedback alerting the user of proper hand placement on the displayed virtual steering wheel, wherein proper hand placement comprises alignment of user hand grip with the created mid-air tactile focal points.

11. The computer system of claim 7, further comprising:

in response to determining that driving credentials of the user are not validated, denying the user request to manually drive the autonomous vehicle.

12. The computer system of claim 7, further comprising:

returning the autonomous vehicle to an automated drive mode in response to input from the user.

13. A computer program product, the computer program product comprising:

one or more computer-readable tangible storage medium and program instructions stored on at least one of the one or more tangible storage medium, the program instructions executable by a processor capable of performing a method, the method comprising:

identifying a user request to manually drive an autonomous vehicle;

in response to determining that driving credentials of the user are validated, displaying a virtual steering wheel to the user within the autonomous vehicle;

providing haptic feedback to the user in response to hand-based interaction with the displayed virtual steering wheel; and enabling manual drive of the autonomous vehicle by the user via the displayed virtual steering wheel, wherein enabling manual drive of the autonomous vehicle by the user further comprises:

enabling manual steering operations of the autonomous vehicle via the displayed virtual steering wheel;

enabling manual acceleration operations of the autonomous vehicle via the displayed virtual steering wheel; and enabling manual braking operations of the autonomous vehicle via the displayed virtual steering wheel.

14. The computer program product of claim 13, wherein the virtual steering wheel is displayed via a holographic projection system of the autonomous vehicle.

15. The computer program product of claim 13, wherein the haptic feedback is created via an ultrasound haptic device of the autonomous vehicle, and wherein providing the haptic feedback further comprises:

creating mid-air tactile focal points; and aligning the created tactile focal points with a profile of the displayed virtual steering wheel.

16. The computer program product of claim 15, further comprising:

providing visual and haptic feedback alerting the user of proper hand placement on the displayed virtual steering wheel, wherein proper hand placement comprises alignment of user hand grip with the created mid-air tactile focal points.

17. The computer program product of claim 13, further comprising:

in response to determining that driving credentials of the user are not validated, denying the user request to manually drive the autonomous vehicle.

\* \* \* \* \*